United States Patent
Marsh et al.

[11] Patent Number: 5,814,800
[45] Date of Patent: *Sep. 29, 1998

[54] DEVICE FOR DETECTING THE USE OF FALSE CARDS BY READING EMBOSSED CHARACTERS

[75] Inventors: Peter Marsh, Preston; Iain Andrew James Lamont, Nr. Clitheroe, both of England

[73] Assignee: Meggitt Ltd., England

[ * ] Notice: This patent issued on a continued prosecution application filed under 37 CFR 1.53(d), and is subject to the twenty year patent term provisions of 35 U.S.C. 154(a)(2).

[21] Appl. No.: 497,226

[22] Filed: Jun. 30, 1995

[30] Foreign Application Priority Data

Jun. 30, 1994 [GB] United Kingdom ............... 9413121

[51] Int. Cl.6 ............... G06K 7/04; G06K 5/00; G06F 17/00
[52] U.S. Cl. ............... 235/448; 205/375; 205/380; 205/440
[58] Field of Search ............... 235/448, 375, 235/380, 440

[56] References Cited

U.S. PATENT DOCUMENTS

| | | | |
|---|---|---|---|
| 3,705,416 | 12/1972 | Head III | 235/448 |
| 3,743,817 | 7/1973 | Kuehnle | 235/448 |
| 3,763,355 | 10/1973 | Brand, Jr. | 235/448 |
| 3,814,905 | 6/1974 | Lawrence et al. | 235/448 |
| 3,917,925 | 11/1975 | Del Rio | 235/448 |
| 4,119,270 | 10/1978 | Hill et al. | 235/448 |
| 4,845,770 | 7/1989 | Koshida | 235/448 |
| 4,950,875 | 8/1990 | Koshida | 235/448 |
| 5,334,823 | 8/1994 | Noblett, Jr. et al. | 235/380 |
| 5,369,263 | 11/1994 | Nair et al. | 235/448 |
| 5,428,210 | 6/1995 | Nair et al. | 235/380 |
| 5,432,327 | 7/1995 | Price | 235/448 |
| 5,559,315 | 9/1996 | Nair et al. | 235/448 |

FOREIGN PATENT DOCUMENTS

WO 94/10650  5/1994  WIPO .

*Primary Examiner*—Donald T. Hajec
*Assistant Examiner*—Douglas X. Rodriguez
*Attorney, Agent, or Firm*—Anthony J. Casella; Gerald E. Hespos; Ludomir A. Budzyn

[57] ABSTRACT

A card reader (for example, a swipe card reader for reading bank or security cards) is disclosed which comprises a detector for detecting surface features of the card such as embossed characters. In this way, a security check for false cards is implemented.

3 Claims, 3 Drawing Sheets

DEVICE FOR DETECTING THE USE OF FALSE CARDS BY READING EMBOSSED CHARACTERS

The present invention is concerned with a device for detecting the use of false cards such as credit cards and bank cards. It is particularly suitable for incorporation into card readers such as the magnetic card readers found in automatic banking and automatic product dispensing machines.

The use of cards comprising a strip of magnetisable material in which information can be magnetically stored is widespread. Familiar examples are the credit and bank cards which comprise a strip of magnetisable material bearing digital information identifying a bank account. Such cards are also sometimes used in security systems, and also in product dispensing systems, for example for the dispensing of fuel to road vehicles.

There are several devices in widespread use for reading the information on cards of this type. One of the simplest of these is the "swipe" reader, comprising an elongate slot which is adapted to receive an edge of the card and through which the card is drawn. As the card is drawn through the slot, the magnetic strip passes a magnetic reader by means of which the information on the card is read.

There are other types of card which carry electronically readable information. One simple type contains an electrically conductive strip which can be severed at a selected point, the unbroken length of the conductor representing, for example, a number of credit units remaining.

It is widely anticipated that still another type of information bearing card—"smart cards", comprising electronic memory and microprocessors will shortly find applications in a range of fields.

A problem with cards of the above types is fraud by copying. In the case of cards with a magnetic strip, it is known to produce "white cards"—cards of a suitable size and shape to be received in a reader and bearing a magnetisable strip on which a known identifying code has been recorded. Such cards can, for example, be used to make fraudulent withdrawals from banking machines and fuel dispensers.

White cards are moderately cheap to produce because they need not have the appearance or the exact outer shape of the original card in order to be accepted by conventional card readers.

Credit and bank cards have an additional distinctive feature: they are embossed with an identifying number and with other characters, the positioning of some of the embossed characters being subject to an ISO standard. The letters and numerals stand proud of the card surface on one face while the other face bears a corresponding set of recesses.

It is an object of the present invention to provide a device for detecting the presence or absence of these embossed characters or other projections/depressions on a surface of a card, and a card reader incorporating such a device.

A further object of the present invention is to provide a device capable of reading information encoded in the embossed characters.

In accordance with a first aspect of the present invention, there is provided a card reader comprising a detector for detecting raised projections or recesses in a surface of a machine-readable card.

More specifically, in accordance with a further aspect of the present invention, there is provided a card reader adapted to detect the use of false cards, comprising:

card support means;

detector support means in fixed spatial relationship to said card support means;

detector means mounted on the detector support means;

means enabling relative displacement of a card being read and said detector means;

follower means mechanically connected to said detector means in such a way that displacement of the follower means may change the state of the detector means, the location of said follower means relative to said card support means being such that said follower means contacts an area of the card being read which is expected to have shaped markings;

mechanical biasing means which urge said follower means toward the card being read; and electronic response means which are electrically connected to said detector means and are adapted to interpret and respond to electrical signals therefrom, wherein said relative displacement of the card being read and the detector means causes shaped markings, if present on said card, to move past said follower means, thereby causing displacement of said follower means which is detected by said detector means and acted on by said electronic response means.

By checking for projections/recesses, the card reader in accordance with the present invention can detect the use of false cards which lack the surface features (such as embossed lettering) of genuine cards.

Because the signals from the detector are fed to response electronics, the signals may be subject to tests to establish whether they conform to the pattern expected. For example, in accordance with the present invention, the response electronics may establish whether the ratio of the projections to a card dimension is characteristic of a genuine card.

Provision is made for relative motion of the card and the detector. The card may be drawn past the detector. Such an arrangement would be appropriate eg. for "swipe" readers. Alternatively, means may be provided to move the detector across the card surface.

Preferably, the detector means comprise a switch which is electrically connected to the electronic response means and is mechanically connected to the follower so that displacement of the mechanical follower can cause a change in the state of the switch.

Alternatively, in accordance with the invention, the detector means may comprises a light emitting means, an optical detector facing said light emitting means and electrically connected to said electronic response means, and a shutter mechanically connected to said follower means and movable thereby, the relative positioning of said shutter and said optical detector being such that motion of said follower can cause said shutter to be interposed between said light emitting means and said optical detector.

The light source may be electrical—most preferably a light emitting diode—or could comprise means for admitting ambient light—eg. an opening or window in a casing.

The shutter may comprise an opaque member which is movable by the follower into or away from a position between the light source and the follower.

In accordance with yet another preferred embodiment of the present invention, the detector means comprise a card reader comprising a piezo-electric transducer mechanically connected to the follower so that displacement of the follower changes a stress exerted on the piezo-electric transducer.

As is well known, a transitory electro-motive force is generated across a piezo-electric crystal when the stress exerted thereon is varied. Thus, a simple detector in accordance with the present invention may comprise a single piezo-electric transducer which generates a signal voltage each time the follower is moved.

More preferably, however, the detector comprises first and second piezo-electric transducers, a time varying electric signal being applied to the first piezo-electric transducer to produce vibrations which are detected by the second piezo-electric transducer and which are detectably varied by the follower.

In such a detector, contact of the follower with a surface of the card being read and/or displacement of the follower due to projections or depressions of said card alters the vibrations detected by the first piezo-electric transducer. This alteration can be electronically detected to provide information about the card.

The detector of the card reader in accordance with the present invention does not have to comprise a mechanical follower.

In accordance with another aspect of the present invention, there is provided a card reader adapted to detect use of false cards, comprising:

card support means;

detector support means in fixed spatial relationship to said card support means;

detector means mounted on the detector support means and comprising a light source positioned and oriented relative to said card support means to emit light onto an area of a card being read which is expected to have shaped markings, and light detecting means responsive to variations in the level of light reflected from the surface of said card;

means enabling relative displacement of a card being read and said detector means; and electronic response means electrically connected to said light detecting means, wherein upon said relative motion of said detector means and the card being read, said shaped markings, if present on said card, move past said detector causing variations in the level of light reflected by said card towards said light detecting means, said variations being detected by said light detecting means and acted on by said electronic response means.

Preferably, the light is incident on the surface of the card at an oblique angle.

In accordance with an alternative aspect of the present invention, there is provided a card reader adapted to detect false cards, comprising:

card support means;

detector support means in a fixed spatial relationship to said card support means;

detector means mounted on said detector support means and comprising means for providing a flow of air, an air duct which is connected to said means for providing a flow of air and which comprises means defining an opening through which air can leave said duct, said means defining an opening being positioned relative to said card support means to be adjacent and open toward a card being read, in use, and pressure sensing means responsive to pressure in said air duct;

means enabling relative displacement of the card being read and said opening; and electronic response means electrically connected to said pressure sensing means, wherein in use, air is emitted through said means defining an opening toward an area of the card being read which is expected to have shaped markings, and the card is moved past said means defining an opening causing variations in pressure in said air duct which are detected by said pressure sensing means and acted on by said electronic response means.

In such a detector, variations in back pressure in the air duct are indicative of passage of projections or depressions of the card surface past the opening of the duct. Again, these variations may be interpreted by electronic means.

In accordance with still another aspect of the present invention, there is provided a card reader adapted to detect the use of false cards, comprising:

card support means;

detector support means in fixed spatial relationship to said card support means;

a plurality of detector means mounted on said detector support means, said detector means being responsive to shaped markings on a card being read and being mutually separated in a first direction;

means enabling relative motion of the card being read and said plurality of detector means in a second direction different from said first direction; and electronic response means electrically connected to each of said detector means;

wherein in use the card being read is moved in said first direction relative to said plurality of detector means, and each detector means detects a different portion of a surface marking, if present on the card being read, and sends a corresponding signal to said electronic response means, which interprets and acts on said signals.

Still more preferably, three detectors are positioned to detect upper, middle and lower portions of a line of characters being read.

In accordance with still a further preferred embodiment of the present invention, the card reader may comprise electronic means connected to the two or more detectors for reading a series of characters embossed on a surface of the card being read.

In accordance with a further aspect of the present invention, there is provided a detector for use in a card reader, comprising a mechanical follower, a light source, an optical detector arranged to detect the light from the source, and a shutter which is arranged to be displaced by the follower, wherein displacement of the shutter causes a change in the light level at the optical detector.

Specific embodiments of the present invention will now be described, by way of example only, with reference to the accompanying drawings, in which.

Figure 1:
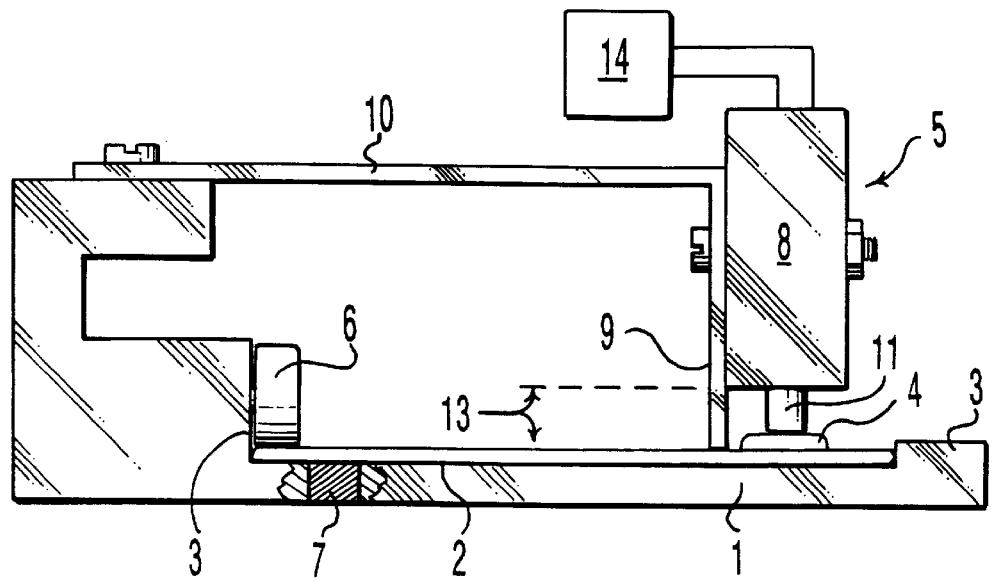
FIG. 1 is a front view of a first embodiment of a card reader in accordance with the present invention.

The Figures are concerned principally with detectors suited for use with known types of card reader, but FIG. 1 additionally shows merely by way of example components of a card reader involved in conveying a card past a reading head and past the detector in accordance with the present invention. It is to be understood that a number of alternative means of conveying the card, or alternatively of moving the detector over a stationary card, could be used.

The card reader in accordance with the present invention illustrated in FIG. 1 comprises a card support 1 on an upper surface of which rests a card 2 which may be a credit card, debit card, smart card or any type of card which would normally bear shaped surface markings and be machine-read. Upward projections 3 of the card support define an elongate recess in which the card is located and along which the card is drawn during reading of the machine-readable information on the card and checking for the presence of embossed characters or other surface markings. In this way, it is ensured that embossed characters 4 positioned at a standard location on the card 2 are in alignment with a detector 5 during checking. The operations of reading and checking can, by virtue of the present invention, be performed during a single "pass" of the card through the reader.

According to the embodiment illustrated in FIG. 1, appropriate motion of the card 2 past the detector 5 is enabled not only by the form of the card support but also by propulsion means, formed as a plurality of rollers 6 (only one of which is shown in FIG. 1) which contact the upper surface of the card 2, and are driven to propel the card over the card support 1.

The particular form of the card support can be varied without departing from the scope of the present invention, and it is not essential to provide means for propelling the card past the detector. For example, the present invention may take the form of a "swipe" reader in which movement of the card past a detector is enabled by provision of an elongate slot dimensioned to receive an edge of a card, appropriate alignment of the card with the detector being achieved when the edge of the card abuts against the bottom of the slot. In such an embodiment, the walls of the slot also acts as the card support, constraining the card laterally.

The card reader illustrated in FIG. 1 further comprises means for reading machine—readable information from the card, in the form of a magnetic reading head 7 disposed within the card support 1. In use, a magnetic strip of the card passes over the magnetic reading head.

As shown in FIG. 1, the detector 5 for detecting projections or depressions in the card comprises a switch 8 mounted on a downwardly projecting arm 9 of a bracket 10. As illustrated, the bracket 10 is screwed to a portion of the card support 1, preventing relative motion of these two components. The switch 8 comprises a follower 11 which is downwardly spring biased. The state of the switch (whether the switch is "off" or "on") is dependent on the vertical position of the follower.

In FIG. 1, the card 2 is shown in the process of being checked. The card is moved in a direction perpendicular to the plane of the paper, so that the embossed characters 4 move past the follower 11, which is thereby moved up and down, changing the state of the switch.

The switch 8 is electrically connected to electronics 14, which interpret the signals generated by the detector to establish whether the appropriate surface markings are present, and which produce an appropriate response. Thus, for example, where the card reader in accordance with the present invention is used in an automatic cash dispenser, the electronics 14 may permit or prevent dispensing of cash.

During the checking process, a separation 13 between the switch 8 and the upper surface of the card 2 is defined by the downwardly projecting arm 9, the lower end of which abuts against said upper surface of the card 2. The bracket 10 has a degree of flexibility in order to allow the downwardly projecting arm 9 and hence the switch 8 to be displaced slightly by the card.

If a card without surface projections were passed through the detector shown in FIG. 1, even if the card had an increased thickness, the state of the switch 8 would not be changed since the separation 13 of the switch from the upper surface of the card would be maintained by the abutment of the lower end of the downwardly projecting arm 9 against the upper surface of the card.

Figure 2:
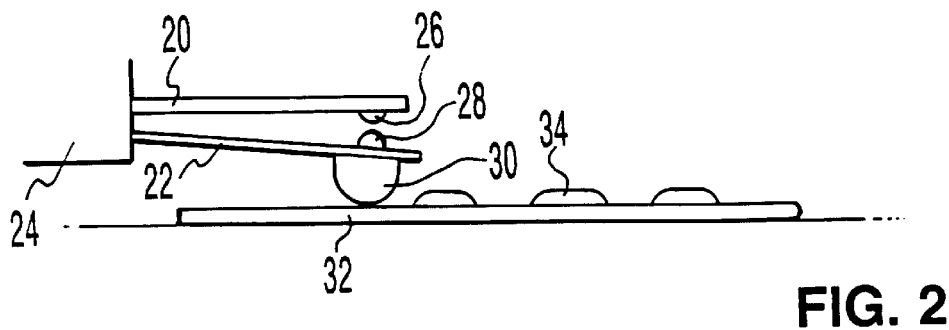
FIG. 2 is a side view of a second embodiment of a detector in accordance with the present invention.

A further specific embodiment of the present invention, again comprising a switch, is shown in FIG. 2 and comprises resiliently deformable upper and lower arms 20,22, each of the arms being mounted at a proximal end (the left hand end in FIG. 2) on a bracket 24. Adjacent the distal end of the upper arm 20, at the lower surface thereof, is provided a switch contact 26. A corresponding switch contact 28 is provided adjacent the distal end of the upper surface of the lower arm 22. Further, a shaped follower 30 is provided at the lower surface of the lower arm 22, adjacent the distal end thereof.

In use, a card 32 whose surface bears projections 34 moves past the follower 30. When the follower 30 is upwardly displaced by the projections 34, it brings the contacts 26,28 together to close the switch.

The embodiment illustrated in FIG. 2 could equally well be adapted to detect depressions in the card surface. In such an embodiment of the present invention, the switch could be normally closed by upward pressure exerted on the follower 30 by the card surface, and be opened when the follower moves downward into depressions.

Figure 3:
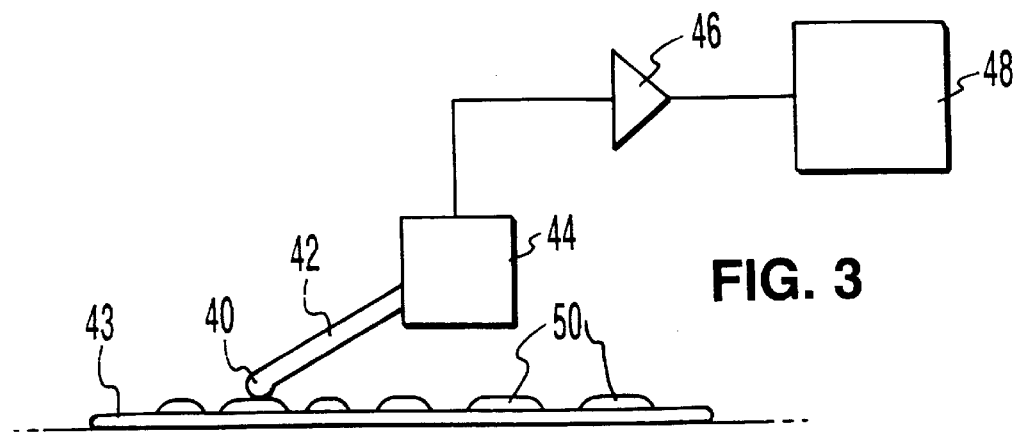
FIG. 3 shows a third embodiment of a detector in accordance with the present invention in side view.

The third embodiment of the detector in accordance with the present invention shown in FIG. 3 comprises a follower 40 connected via a follower arm 42 to an electrical or electronic transducer 44. The transducer is electrically connected via an amplifier 46 to an electronic controller 48. The follower arm 42 is downwardly spring biased so that the follower 40 stays in contact with the card while the card is drawn past the follower. In use, the card 43 is drawn in a direction towards the left or right in FIG. 2. The raised embossed characters 50 cause displacement of the follower 40 which in turn causes the transducer 44 to send an electrical signal to the amplifier. A variety of types of transducer is suitable for this embodiment. The transducer 44 may be in the form of a microphone, in which case vibrations caused by displacement of the follower 40 are transmitted along the follower arm 42 and detected by the microphone. Alternatively, the transducer may comprise a piezo-electric crystal, the follower arm 42 being mounted in such a way that displacement of the follower 40 causes a force to be exerted on the piezo-electric crystal. This force may be magnified using mechanical advantage—for example by using a substantially rigid follower arm pivoted about a point close to the piezo-electric crystal and bearing on said crystal.

Figure 4:
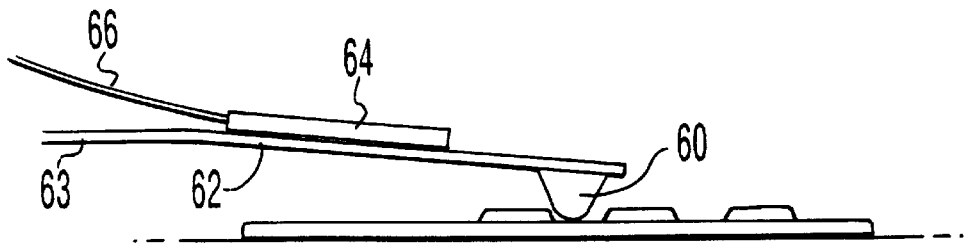
FIG. 4 is a side view of a fourth embodiment of a detector in accordance with the present invention.

A piezo-electric crystal is used to detect motion of the follower in the fourth embodiment of the present invention illustrated in FIG. 4.

As in the FIG. 2 embodiment, a shaped follower 60 is mounted at the distal end of an elongate resilient arm 62 whose proximal end 63 is rigidly mounted. A piezo-electric crystal 64 extends along a surface of the arm 62 (in this case the upper surface) and is affixed thereto, so that bending of the arm caused by movement of the follower 60 causes a change of dimension of the piezo-electric crystal, and a consequent voltage between electrical contacts connected to said crystal, which is transmitted via wires 66 to control electronics.

In the embodiment illustrated in FIG. 4, a transitory voltage is generated each time the follower 60 is moved, allowing the edges of projections or recesses in a card to be detected.

More sophisticated embodiments can utilise a piezo-electric crystal to generate a continuous signal. One such embodiment of the present invention (not illustrated) comprises all of the components shown in FIG. 4 plus a second piezo-electric crystal which is driven by a time varying electrical signal to vibrate the arm 62. The vibrations of the arm 62 are modified depending on the position of the follower 60, and on whether the follower is in contact with a surface. For example, contact of the follower 60 reduces the amplitude of the vibrations. Displacement of the follower by projections on a card may further reduce the amplitude.

The first piezo-electric crystal (labelled 64 in FIG. 4) continuously detects the vibrations, and control electronics of the card reader can interpret variations in the signal from the first piezo-electric crystal to yield information about the shape of the card.

Figure 5:
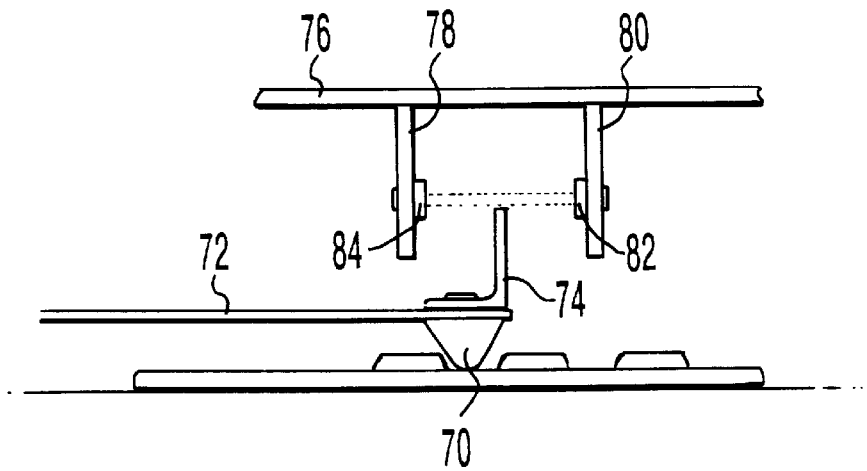
FIG. 5 is a side view of a fifth embodiment of a detector in accordance with the present invention.

A particularly advantageous embodiment of the present invention is illustrated in FIG. 5. Again, this comprises a shaped follower 70 mounted adjacent the distal end of a resiliently bendable arm 72. In this embodiment however, a shutter is provided adjacent the said distal end. The shutter takes the form of an opaque, planar member 74 projecting upwardly from the upper surface of the arm 72. The detector further comprises a horizontally extending printed circuit board 76 having first and second downward projections 78,80. Mounted on the first downward projection 80 is a light emitter 82, which may be a light emitting diode, and which is positioned to illuminate a light detector 84 mounted on the second downward projection 84. The printed circuit board 76 is disposed above the arm 72, and is aligned so that upward movement of the follower 70 causes the shutter to be interposed between the light emitter 82 and the light detector 84. The consequent reduction in light level at the detector is communicated to control electronics.

Figure 6:
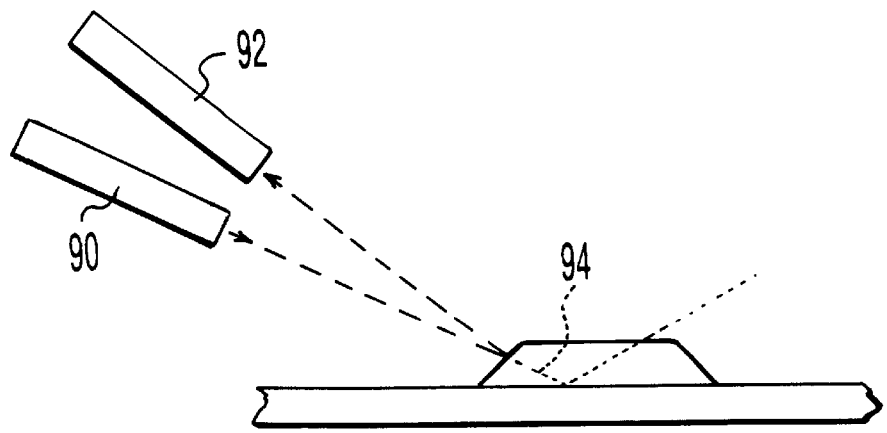
FIG. 6 is a side view of a sixth embodiment of a detector in accordance with the present invention.

A mechanical follower is not essential to the card reader in accordance with the present invention, as the embodiment illustrated in FIG. 6 demonstrates. In this embodiment, reflected light is used to detect the presence of projections and/or recesses. A light emitter 90 is directed toward the surface of a card being read. In the illustrated embodiment, the emitted light is obliquely incident the card surface. A light detector 92 is disposed adjacent the light emitter and is directed to receive light from a direction almost anti-parallel to the direction of the light emitted by the emitter 90.

When the emitted light falls on a planar portion of the card surface, it is reflected away from the detector 92 in the direction shown by fine dotted lines 94 in FIG. 6.

However when, as in the Figure, the emitted light strikes an angled surface defining the periphery of a projection, it is reflected through almost 180 degrees, towards the light detector. The consequent variation of detected light level during scanning of the card is communicated to control electronics.

Figure 7:
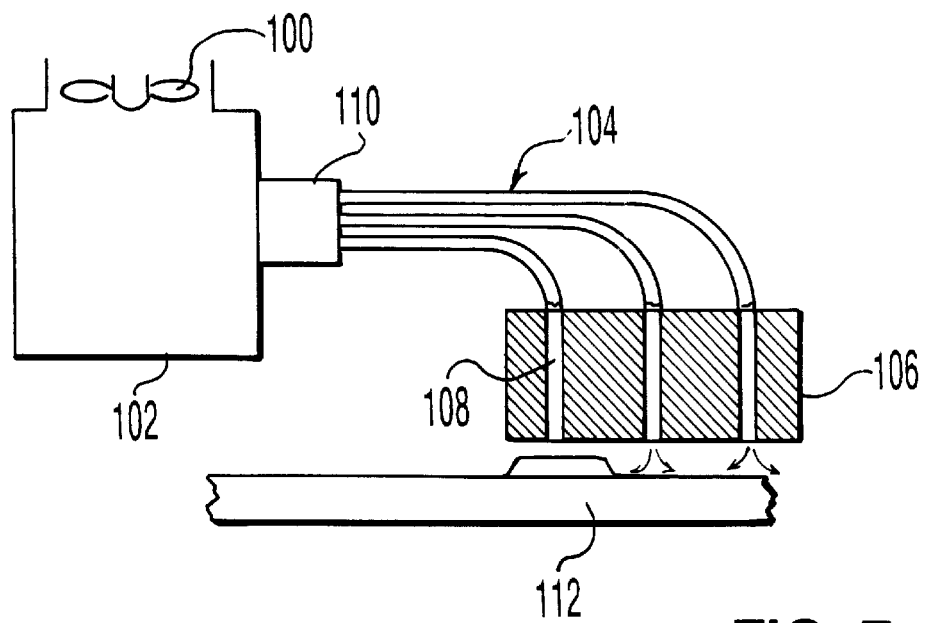
FIG. 7 is a side view of a seventh embodiment of a detector in accordance with the present invention.

In yet another specific embodiment of the present invention illustrated in FIG. 7, a flow of air is used to detect the presence or absence of projections or depressions on the surface of the card being read. The air flow is provided by a fan 100 via a pressure vessel 102, which smooths the air flow to flexible supply tubes 104 connected to a reading head 106. As shown, the reading head of the present embodiment is a cuboid having a lower surface which, in use, lies adjacent a card being scanned, and which is penetrated by vertical through-going bores 108, the upper ends of which are connected to respective supply tubes 104 and are thereby supplied with air while the bottom ends of the bores are open towards the card being scanned.

While a detector may be constructed with a single bore 108 and a single supply tube, the embodiment illustrated, which comprises three supply tubes and three corresponding bores, is preferred for reasons which will be explained below.

The detector in accordance with the present embodiment of the invention further comprises a pressure transducer 110 arranged to detect pressure in the flexible tubes 104. The transducer could, alternatively, be disposed in or on the reading head to detect pressure in the bores 108.

A card being read is shown at 112 in FIG. 7. The card is moved past the reading head in a direction which, in the Figure, is perpendicular to the plane of the paper. Air flowing out of the lower ends of the bores 108 interacts with the surface of the card, generating a back pressure in the supply tubes and in the vertical bores 108 which varies with the distance of the card surface from the bottom ends of the bores 108. Consequently, the total pressure within the tubes (measured by the transducer 110) is indicative of the distance of the lower ends of the bores 108 from the card surface, and varies detectably when projections or recesses of the card traverse the lower ends of the bores.

The present embodiment may be provided with a single pressure transducer which measures pressure in one or more tubes, or may comprise a plurality of pressure transducers, each measuring pressure in a single respective tube or bore. In either case, the signal(s) from the transducers are electronically interpreted to yield information about the card surface.

Although all of the Figures show devices detecting raised projections on a card, all of the embodiments described herein would be suitable for detecting depressions. Clearly, the embodiment shown (for example) in FIG. 1 would require slight modification in that the follower 6 would need to be spring biased to project below the lower end of the downwardly projecting arm 3, so that it would extend into the depressions.

For increased security, devices adapted to detect depressions on one face and projections on the opposite face could be used in conjunction.

Whatever the exact form of the detector, the signal it produces will normally be passed to an electronic controller. This controller can further process the signal to establish whether it corresponds to embossed characters of the appropriate form. Where, as in the embodiments shown in FIGS. 1 to 6, a single detector is provided, analysis may be made of the start and end positions of the embossed characters and of the number and length of the gaps between embossed projections or depressions.

Additionally, it is possible to set a minimum height of the projections or depressions) at which a card will be accepted. Similarly, in the embodiments in which a variable signal is generated depending on the height of the projections or depression, a maximum value of the signal could also be set.

In a further development of this invention, it is possible, even using a single detector, to detect whether an embossed character falls into one of a number of groups. For example, it is possible to detect whether a character is a 1, 4 or 7. If an embossed character is found to fall within this group, it can be classed as, say "group A"; any other character is "group B". When the card is being scanned magnetically, it is also scanned for the character sequence on the embossing. Whilst the exact characters are not known, the sequence of group A and group B characters can be compared to those read from the magnetic strip for validation. Because of the length of a typical card number, often 18 digits, the A,B sequence goes a long way in verifying reasonably conclusively the embossing with the magnetic stripe.

However, the flexibility of the present invention can be greatly increased by providing a plurality of detectors, as in the embodiment already described with reference to FIG. 7 and the further embodiment of the present invention schematically illustrated in FIG. 8.

Figure 8:
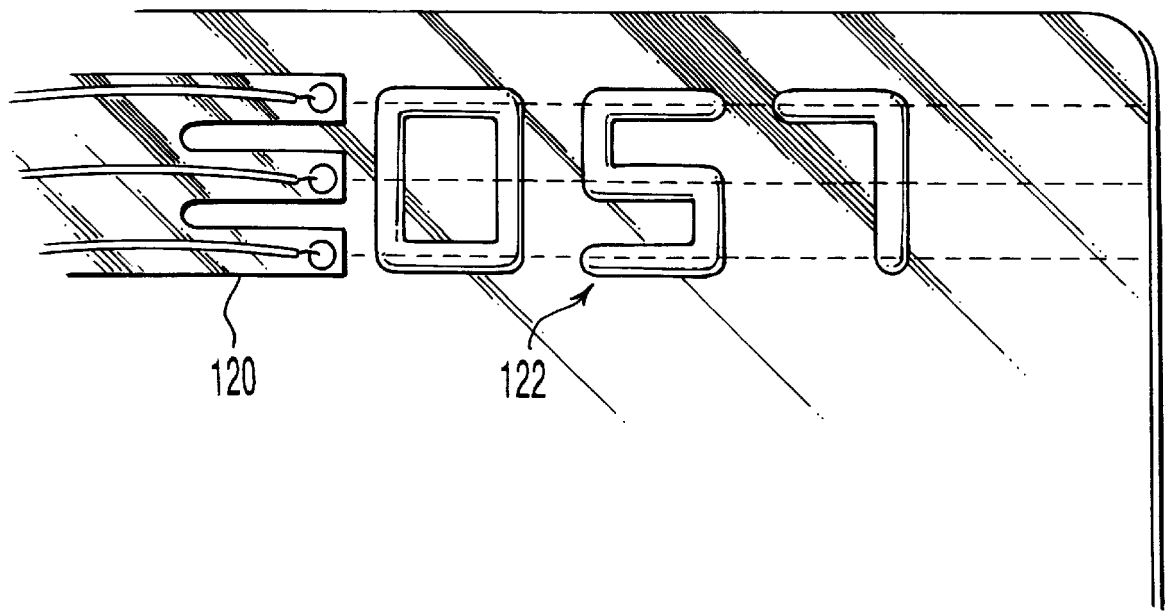
FIG. 8 is a schematic plan view of an eighth embodiment of a detector in accordance with the present invention.

In the FIG. 8 embodiment three detectors 120 (which may be any of the above described types of detector, or could even take some other form), laterally spaced with regard to the direction of travel of the card (which is left to right in the Figure) are provided to detect the bottom, top and middle or a row of embossed characters 122. By comparing the signals from the three detectors, control electronics may actually read the characters, thereby greatly increasing the security of the card reader.

We claim:

1. A card reader detecting the use of false cards, each said card including a magnetic strip, and at least selected cards having shaped markings, said card reader comprising:

a card support;

a detector support in fixed spatial relationship to said card support;

three detectors mounted on said detector support;

means enabling relative displacement of a card being read and said detectors in a longitudinal direction;

a follower apparatus consisting of three followers mechanically connected respectively to said three detectors, said followers being mutually separated in a lateral direction and being positioned to contact upper, middle and lower portions respectively of shaped characters on said card, if present and to move in response to said contact, said movement by said followers being detected by the respective detectors;

mechanical biasing means for urging said followers toward said card being read;

magnetic reading means for reading information stored on the magnetic strip of said card being read; and electronic response means electrically connected to said detectors and said magnetic reading means, said electronic response means for classifying any shaped marking detected by said detectors and said followers into one of at least two classes of possible shaped markings having the detected shape and for comparing the class of possible shaped markings having the detected shape to information stored on the magnetic strip as read by the magnetic reading means, wherein each said class of possible shaped markings having the detected shape includes at least two different possible shaped markings.

and wherein said relative displacement of the card being read and said detectors causes shaped markings, if present on said card, to move past said followers, thereby causing displacements of said followers which are detected by said detectors which send corresponding signals to said electronic response means which verifies said shaped markings against the magnetic strip.

2. A card reader as claimed in claim 1, wherein each said detector is mechanically connected to the respective follower so that displacement of the follower changes a stress exerted on the respective detector.

3. A card reader as claimed in claim 2, wherein each said detector comprises a piezo-electric transducer, which is electrically connected to the electronic response means.

* * * * *